(12) United States Patent
Ota et al.

(10) Patent No.: US 8,138,287 B2
(45) Date of Patent: Mar. 20, 2012

(54) (METH)ACRYLATE COPOLYMER FOR SYRUP AND RESIN COMPOSITION THEREOF

(75) Inventors: Tsuyoshi Ota, Chiba (JP); Shinichi Yukimasa, Chiba (JP); Yutaka Obata, Chiba (JP); Tomoaki Takebe, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 341 days.

(21) Appl. No.: 12/515,757

(22) PCT Filed: Nov. 19, 2007

(86) PCT No.: PCT/JP2007/072404
§ 371 (c)(1),
(2), (4) Date: May 21, 2009

(87) PCT Pub. No.: WO2008/062764
PCT Pub. Date: May 29, 2008

(65) Prior Publication Data
US 2010/0022733 A1    Jan. 28, 2010

(30) Foreign Application Priority Data
Nov. 22, 2006  (JP) ................. 2006-316078

(51) Int. Cl.
*C08F 230/08* (2006.01)
*C08F 220/10* (2006.01)
*C08F 220/26* (2006.01)

(52) U.S. Cl. ............ 526/279; 526/328.5; 526/320

(58) Field of Classification Search ............ 526/279, 526/328.5, 320
See application file for complete search history.

(56) References Cited

U.S. PATENT DOCUMENTS
6,025,449 A    2/2000    Enomoto et al.

FOREIGN PATENT DOCUMENTS

| JP | 02 043506 | | 2/1990 |
|---|---|---|---|
| JP | 2 179940 | | 7/1990 |
| JP | 4 75241 | | 11/1992 |
| JP | 11061081 A | * | 3/1999 |
| JP | 2004 176043 | | 6/2004 |
| JP | 2005 187643 | | 7/2005 |
| JP | 2005 281363 | | 10/2005 |
| JP | 2005281363 A | * | 10/2005 |
| JP | 2006 213851 | | 8/2006 |
| WO | 2006 051803 | | 5/2006 |
| WO | WO 2007/129536 A1 | | 11/2007 |

OTHER PUBLICATIONS

"Industrial Chemicals for Coating and Adhesive Industries " (Kowa, 2002).*

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention provides a copolymer for syrup, characterized by being formed from (A) 1 to 60 mass % of at least one (meth)acrylate compound selected from among a (meth) acrylate-modified silicone oil, an alkyl(meth)acrylate, a monoalkylene glycol(meth)acrylate, and a polyalkylene glycol(meth)acrylate, and (B) 99 to 40 mass % of a (meth) acrylate compound having a $C \geq 6$ alicyclic hydrocarbon group bonded thereto via an ester bond; a (meth)acrylate composition containing a (meth)acrylate monomer and 1 to 60 mass % of the (meth)acrylate copolymer for syrup; and a cured product of the composition. The (meth)acrylate copolymer for syrup of the present invention has excellent solubility, particularly in a (meth)acrylate compound having an alicyclic ester substituent, and a (meth)acrylate resin composition containing the copolymer provides a stable cured product having high transparency and high resistance to UV rays and heat. Thus, the cured product is suitably used as a material for lenses, illumination devices, automobiles, displays, optical-semiconductors, etc.

10 Claims, No Drawings

# (METH)ACRYLATE COPOLYMER FOR SYRUP AND RESIN COMPOSITION THEREOF

This application is a 371 of PCT/JP2007/072404 filed Nov. 19, 2007.

TECHNICAL FIELD

The present invention relates to a (meth)acrylate copolymer for use as a syrup for providing a resin having excellent stability to UV rays and heat, and to a resin composition containing the copolymer. More particularly, the invention relates to a (meth)acrylate copolymer for syrup which has high solubility in a (meth)acrylate compound and which provides an acrylic resin having high UV resistance and excellent heat resistance and to the resin composition containing the copolymer.

BACKGROUND ART

Acrylic resins, having excellent optical characteristics, are widely employed as a material for lenses, illumination devices, automobile parts, displays, optical-semiconductors, etc.

When acrylic resin is formed into a plate or the like, a composition containing (meth)acrylate monomer(s) is cast into a mold and polymerized therein. This method is known as cast polymerization. During cast polymerization, in order to prevent leakage of the raw material composition through the mold, enhance curing rate, and reduce shrinkage in curing, the viscosity of the composition is generally adjusted to a desired value. In this case, a viscous liquid, which is called a syrup, is often used to control the viscosity of the composition.

A syrup for producing acrylic resin is prepared through a known method which includes dissolving a separately produced polymer (e.g., poly(methyl methacrylate)) in a raw material monomer or through a known method which includes partially polymerizing a raw material monomer and dissolving the polymerized product in the raw material monomer (Patent Document 1).

By virtue of its excellent transparency, acrylic resin is often used in the vicinity of a light source. In this case, if the acrylic resin has poor heat resistance, yellowing, reduction in light transmittance, and deformation may occur. In order to prevent these phenomena, there has been proposed a composition containing a (meth)acrylate monomer having a substituent of a tricyclodecane structure, which monomer is thought to have a comparatively high glass transition temperature, and a polyfunctional acrylate of the (meth)acrylate (Patent Document 2).

A syrup produced from a (meth)acrylate monomer having such an alicyclic hydrocarbon substituent has drawbacks. Specifically, since poly(methyl methacrylate) and a polymer of a methacrylate having a tricyclodecane structure are not readily dissolved in a (meth)acrylate monomer having alicyclic hydrocarbon substituent, the mixture must be heated, or kneaded by means of a kneader for dissolution. In addition, since such a methacrylic polymer is difficult to dissolve in a (meth)acrylate monomer having alicyclic hydrocarbon substituent, a cured product has poor characteristics (e.g., poor hue). When such a cured product is used under heat or UV light, the hue of the product is further deteriorated.

Meanwhile, a copolymer produced mainly from a methacrylate having an adamantyl group is known to be employed as an optical disk substrate (Patent Document 3). However, there has never been known a syrup for use in production of such a copolymer.

Patent Document 1: Japanese Patent Publication (kokoku) No. Hei 4-75241
Patent Document 2: Japanese Patent Application Laid-Open (kokai) No. 2005-187643
Patent Document 3: Japanese Patent Application Laid-Open (kokai) No. Hei 2-179940

DISCLOSURE OF THE INVENTION

Problems to be Solved by the Invention

In view of the foregoing, an object of the present invention is to provide a copolymer suitably used as a syrup which is dissolved in a (meth)acrylate monomer, and a cured product having high UV resistance and excellent heat resistance produced from a syrup (resin composition) containing the copolymer.

Means for Solving the Problems

The present inventors have carried out extensive studies for attaining the object, and have found that this object can be attained by a copolymer produced through polymerization of a monomer mixture which contains, at a predetermined ratio, a specific (meth)acrylate compound and a (meth)acrylate having a $C \geqq 6$ alicyclic hydrocarbon group bonded thereto via an ester bond can serve as a syrup. The present invention has been accomplished on the basis of this finding.

Accordingly, the present invention provides the following (meth)acrylate copolymers for syrup, (meth)acrylate resin compositions, and cured product.

1. A (meth)acrylate copolymer for syrup, characterized by being formed from (A) 1 to 60 mass % of at least one (meth)acrylate compound selected from among a (meth)acrylate-modified silicone oil, an alkyl(meth)acrylate, a monoalkylene glycol (meth)acrylate, and a polyalkylene glycol (meth)acrylate, and (B) 99 to 40 mass % of a (meth)acrylate compound having a $C \geqq 6$ alicyclic hydrocarbon group bonded thereto via an ester bond.

2. A (meth)acrylate copolymer for syrup as defined in 1 above, wherein the component (B) is a (meth)acrylate compound having at least one alicyclic hydrocarbon group selected from an adamantyl group, a norbornyl group, an isobornyl group, and a dicyclopentanyl group and bonded thereto via an ester bond.

3. A (meth)acrylate copolymer for syrup as defined in 2 above, wherein the component (B) is a (meth)acrylate compound having an adamantyl group bonded thereto via an ester bond.

4. A (meth)acrylate copolymer for syrup as defined in any of 1 to 3 above, which is used for producing a syrup for producing acrylic resin.

5. A (meth)acrylate resin composition, characterized by comprising (C) a (meth)acrylate monomer and 1 to 60 mass % of a (meth)acrylate copolymer for syrup as recited in any one of 1 to 4 above.

6. A (meth)acrylate resin composition as defined in 5 above, wherein (C) the (meth)acrylate monomer is a (meth)acrylate compound having a $C \geqq 6$ alicyclic hydrocarbon group bonded thereto via an ester bond.

7. A (meth)acrylate resin composition as defined in 6 above, wherein (C) the (meth)acrylate monomer is a (meth)acrylate compound having an adamantyl group bonded thereto via an ester bond.

8. A (meth)acrylate resin cured product, characterized by being produced through curing a (meth)acrylate resin composition as recited in any of 5 to 7 above.

Effects of the Invention

The (meth)acrylate copolymer for syrup of the present invention has excellent solubility, particularly in a (meth)acrylate compound having an alicyclic ester substituent, and a (meth)acrylate resin composition containing the copolymer provides a stable cured product having high transparency and high resistance to UV rays and heat. Thus, the cured product is suitably used as a material for lenses, illumination devices, automobiles, displays, optical-semiconductors, etc.

BEST MODES FOR CARRYING OUT THE INVENTION

A characteristic feature of the (meth)acrylate copolymer for syrup according to the present invention resides in that the copolymer is formed from (A) at least one (meth)acrylate compound selected from among a (meth)acrylate-modified silicone oil, an alkyl(meth)acrylate, a monoalkylene glycol (meth)acrylate, and a polyalkylene glycol (meth)acrylate, and (B) a (meth)acrylate compound having a C≧6 alicyclic hydrocarbon group bonded thereto via an ester bond.

Firstly, the (meth)acrylate-modified silicone oil serving as the (meth)acrylate compound of component (A) is a compound having a dialkylpolysiloxane skeleton with an acrylic group and/or methacrylic group at one end. Generally, the (meth)acrylate-modified silicone oil is a modified product of dimethylpolysiloxane. However, the entire or part of the alkyl groups in the dialkylpolysiloxane skeleton may be substituted by a phenyl group or an alkyl group other than methyl. Examples of the alkyl group other than methyl include ethyl and propyl. Specific examples of the silicon oil include X-24-8201, X-22-174DX, X-22-2426, X-22-2404, X-22-164A, and X-22-164C (these species being products of Shin-Etsu Chemical Co., Ltd.), and BY16-152D, BY16-152, and BY16-152C (these species being products of Dow Corning Toray).

The alkyl(meth)acrylate serving as component (A) is preferably an alkyl(meth)acrylate having a linear or branched alkyl group bonded thereto via an ester bond. No particular limitation is imposed on the number of carbon atom(s) of the alkyl group, and an alkyl group having 1 to about 20 carbon atoms is preferred from the viewpoint of solubility, more preferably those having 2 to 20 carbon atoms, particularly preferably those having 6 to 20 carbon atoms. Specific examples of the alkyl(meth)acrylate include (meth)acrylates of an alkyl such as methyl, ethyl, propyl, butyl, n-hexyl, 2-ethylhexyl, n-octyl, dodecyl, or stearyl. Among them, (meth)acrylates of an alkyl group selected from among n-hexyl, 2-ethylhexyl, n-octyl, dodecyl, and staeryl are particularly preferred.

Examples of the monoalkylene glycol (meth)acrylate serving as component (A) include ethylene glycol (meth)acrylate, propylene glycol (meth)acrylate, and butylene glycol (meth)acrylate.

Polyalkylene glycol (meth)acrylates such as polyethylene glycol (meth)acrylate, polypropylene glycol (meth)acrylate, and polybutylene glycol (meth)acrylate are compounds each having a (meth)acrylate moiety at one end. Such compounds are preferably employed, since they imparts to the resin excellent resistance to heat-induced yellowing. Specific examples include methoxydiethylene glycol methacrylate (M-20G, product of Shin-Nakamura Chemical Co., Ltd.), methoxypolyethylene glycol #400 methacrylate (M-90G, product of Shin-Nakamura Chemical Co., Ltd.), methoxypolyethylene glycol #1000 methacrylate (M-230G, product of Shin-Nakamura Chemical Co., Ltd.), and phenoxyethylene glycol methacrylate (PHE-1GM, product of Shin-Nakamura Chemical Co., Ltd.).

These (meth)acrylate compounds serving as the aforementioned component (A) may be used singly or in combination of two or more species. The amount of component (A) incorporated into the (meth)acrylate copolymer for syrup must be adjusted to 1 to 60 mass %, preferably 10 to 50 mass %. When the amount is 1 mass % or more, the (meth)acrylate copolymer can possess high solubility in a monomer, whereby a syrup can be readily formed from the copolymer, and the final cured product has good toughness. In addition, the cured product has excellent resistance to UV rays. When the amount is 60 mass % or less, the final cured product has excellent rigidity and heat resistance.

Nest, examples of the alicyclic hydrocarbon group of the (meth)acrylate compound having a C≧6 alicyclic hydrocarbon group bonded thereto via an ester bond and serving as component (B) include cyclohexyl, 2-decahydronaphthyl, adamantyl, 1-methyladamantyl, 2-methyladamantyl, biadamantyl, dimethyladamantyl, norbornyl, 1-methylnorbornyl, 5,6-dimethylnorbornyl, isobornyl group, tetracyclo[4.4.0.1$^{2,5}$.1$^{7,10}$]dodecyl, 9-methyl-tetracyclo[4.4.0.1$^{2,5}$.1$^{7,10}$]dodecyl, bornyl, and dicyclopentanyl group. Of these, adamantyl, norbornyl, isobornyl, and dicyclopentanyl are preferred. Particularly, adamantyl is more preferred, since it impart to the resin excellent resistance to UV rays. Among adamantyls, 1-adamantyl is particularly preferred. In the present invention, the aforementioned (meth)acrylate compounds serving as component (B) may be used singly or in combination of two or more species.

In the present invention, in addition to the aforementioned monomer components (A) and (B), one or more other (meth)acrylates may be added in accordance with need. In this case, each of the additional monomers preferably has ≦1 (meth)acryl group in a molecule thereof. When a crosslinkable monomer having two or more functionality is employed, the produced copolymer has reduced solubility, possibly failing to produce syrup or the like.

In a preferred method for producing the (meth)acrylate copolymer for syrup of the present invention, a radical polymerization initiator is added to a mixture of the aforementioned component (A), a (meth)acrylate compound serving as component (B), and an additional (meth)acrylate, and the mixture is allowed to react through solution polymerization, suspension polymerization, etc. for rigorously controlling reaction, to thereby yield a copolymer. To the copolymer, the (meth)acrylate compound having a C≧6 alicyclic hydrocarbon group bonded thereto via an ester bond and serving as component (B) is added, to thereby prepare a syrup.

The radical polymerization initiator employed for producing the (meth)acrylate copolymer for syrup is preferably an organic peroxide. Specific examples of the peroxide compound include ketone peroxides such as methyl ethyl ketone peroxide, methyl isobutyl ketone peroxide, acetylacetone peroxide, cyclohexanone peroxide, and methylcyclohexanone peroxide; hydroperoxides such as 1,1,3,3-tetramethylbutyl hydroperoxide, cumene hydroperoxide, and t-butyl hydroperoxide; diacyl peroxides such as diisobutylyl peroxide, bis-3,5,5-trimethylhexaonol peroxide, lauroyl peroxide, benzoyl peroxide, and m-toluylbenzoyl peroxide; dialkyl peroxide such as dicumyl peroxide, 2,5-dimethyl-2,5-di(t-butylperoxy)hexane, 1,3-bis(t-butylperoxopropyl)hexane, t-butylcumyl peroxide, di-t-butyl peroxide, and 2,5-dimethyl-2, 5-di(t-butylperoxy)hexene; peroxyketals such as 1,1-di(t-butylperoxy-3,5,5-trimethyl)cyclohexane, 1,1-di-t-butylperoxycyclohexane, and 2,2-di(t-butylperoxy)butane; alkyl peresters such as 1,1,3,3-tetramethylbutyl peroxyneodicarbonate, α-cumyl peroxyneodicarbonate, t-butyl peroxyneodicarbonate, t-hexyl peroxypivalate, t-butyl peroxypivalate, 1,1,3,3-tetramethylbutyl peroxy-2-ethylhexanoate, t-amyl peroxy-2-ethylhexanoate, t-butyl peroxy-2-ethylhexanoate, t-butyl peroxoisobutylate, di-t-butyl peroxyhexahydroterephthalate, 1,1,3,3-tetramethylbutyl peroxy-3,5,5-trimethylhexanoate, t-amyl peroxy-3,5,5-trimethylhexanoate, t-butyl peroxy-3,5,5-trimethylhexanoate, t-butyl peroxyacetate, t-butyl peroxybenzoate, and dibutyl peroxytrimethyladipate; peroxycarbonates such as di-3-methoxybutyl peroxydicarbonate, di-2-ethylhexyl peroxydicarbonate, bis(1,1-butylcyclohexaoxy dicarbonate), diisopropyloxy dicarbonate, t-amyl peroxopropylcarbonate, t-butyl peroxoisopropyl carbonate, t-butyl peroxy-2-ethylhexylcarbonate, and 1,6-bis(t-butyl peroxycarboxy)hexane; 1,1-bis(t-hexylperoxy)cyclohexane; and (4-t-butylcyclohexyl) peroxydicarbonate.

An azo compound is also preferably employed as a radical polymerization initiator. The azo compound may be oil-soluble or water-soluble. Examples of the oil-soluble azo compound include 2,2'-azobis(isobutyronitrile), 2,2'-azobis(4-methoxy-2,4-dimethylvaleronitrile), 2,2'-azobis(2,4-dimethylvaleronitrile), dimethyl-2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], 1-[(cyano-1-methylethyl)azo]formamide, 2,2'-azobis(N-butyl-2-methylpropionamide), and 2,2'-azobis(N-cyclohexyl-2-methylpropionamide).

Specific examples of the water-soluble azo compound include 2,2'-azobis[2-(2-imidazolin-2-yl)propane]dihydrochloride, 2,2'-azobis[2-(2-imidazolin-2-yl)propane]disulfate dihydrate, 2,2'-azobis(methylpropionamidine)dihydrochloride, 2,2'-azobis[N-(2-carboxyethyl)-2-methylpropionamidine]hydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane) dihydrochloride, 2,2'-azobis{2-methyl-N-[1,1-bis(hydroxymethyl)-2-hydroxyethyl]propionamide}, and 2,2'-azobis[2-methyl-N-(2-hydroxyethyl)propionamide].

The aforementioned radical polymerization initiators may be used singly or in combination of a plurality of species. No particular limitation is imposed on the amount of radical polymerization initiator(s), and the amount is generally 0.0001 to 10 mass % with respect to the total amount of monomers, preferably 0.01 to 5 mass %. When the amount of radical polymerization initiator(s) is 0.0001 mass % or more, polymerization smoothly proceeds, whereas when the amount is 10 mass % or less, reaction can be readily controlled.

In a polymer production method for producing the (meth)acrylate copolymer for syrup of the present invention, preferably employed conventionally known techniques such as solution polymerization (in the presence on inert solvent during polymerization), suspension polymerization, etc. for rigorously controlling reaction.

During polymerization, the amount of (B) (meth)acryl compound component having a $C \geqq 6$ alicyclic hydrocarbon group in the polymer is preferably 50 mass % or more, more preferably 55 mass % or more. When the amount of 50 wt. % or more, the produced polymer has excellent toughness and heat resistance.

The solvent employed in production of the copolymer may be a solvent generally employed in radical polymerization. Specific examples of the solvent include water; ethers such as tetrahydrofuran; ketones such as methyl ethyl ketone; aromatic hydrocarbons such as toluene; saturated hydrocarbon such as hexane and cyclohexane; esters such as ethyl acetate; and halohydrocarbons such as trichloromethane. Of these, solvents which can dissolve the formed polymer are preferred for solution polymerization. Specifically, methyl ethyl ketone, toluene, etc. are preferred.

The temperature at which the copolymer is produced, which varies depending on the type of the used radical polymerization initiator, is generally 0 to 150° C., preferably 20° C. to 100° C.

The molecular weight (Mw) of the produced polymer is generally 1,000 to 5,000,000, preferably 10,000 to 2,000,000. When the molecular weight is 1,000 or higher, the produced syrup can readily possess a viscosity suitable for handling during curing, whereas when the molecular weight is 2,000,000 or lower, the polymer can be readily dissolved in the (meth)acrylate compound.

When solvent is employed, the solvent is preferably removed after polymerization through a procedure including distillation or evaporation under reduced pressure, precipitation in poor solvent, and filtration. In this case, the amount of residual solvent is generally 5 mass % or less, preferably 1 mass % or less. When the residual solvent amount is 5 mass % or less, foaming or the like can be prevented in curing.

By adding a polymerizable compound such as a (meth)acrylic compound to the thus-produced copolymer, a syrup can be formed.

Notably, when the copolymer is dissolved in the (meth)acrylic compound, the copolymer is advantageously crushed to have a reduced particle size or heated, in order to facilitate dissolution.

A characteristic feature of the (meth)acrylate resin composition of the present invention resides in that the composition comprises (C) a (meth)acrylate monomer and 1 to 60 mass % of the aforementioned (meth)acrylate copolymer for syrup.

No particular limitation is imposed on the species of (C) (meth)acrylate monomer employed in the (meth)acrylate resin composition of the present invention and, for example, the aforementioned components (A) and (B) may be employed. Among them, (meth)acrylates each having a $C \geqq 6$ alicyclic hydrocarbon group bonded thereto via an ester bond are preferred, from the viewpoints of heat resistance and weather resistance. Examples of preferred (meth)acrylates include cyclohexyl acrylate, cyclohexyl methacrylate, 1-adamantyl(meth)acrylate, norbornyl(meth)acrylate, isobornyl(meth)acrylate, and dicyclopentanyl(meth)acrylate. Also, (meth)acrylates each having a linear or branched C6 to C20 alkyl group bonded thereto via an ester bond are preferred, from the viewpoints of weather resistance and toughness. Examples of preferred alkyl groups of the (meth)acrylates include n-hexyl, 2-ethylhexyl, n-octyl, dodecyl, and stearyl.

The (C) (meth)acrylate monomer employed in the (meth)acrylate resin composition of the present invention is preferably a (meth)acrylate having a $C \geqq 6$ alicyclic hydrocarbon group. Examples of the (meth)acrylate include cyclohexyl acrylate, cyclohexyl methacrylate, 1-adamantyl(meth)acrylate, norbornyl(meth)acrylate, isobornyl(meth)acrylate, and dicyclopentanyl group (meth)acrylate.

In the present invention, good heat resistance can be attained through employment of an alicyclic hydrocarbon group having 6 or more carbon atoms. Since the ester substituent is not an aromatic group but is an alicyclic hydrocarbon group, UV-ray-induced deterioration can be prevented.

In the present invention, a (meth)acrylate compound having an adamantyl group bonded thereto via an ester bond is particularly preferably employed as the (meth)acrylate monomer of component (C), good heat resistance and weather resistance can be attained.

The (meth)acrylate monomers (C) may be used in combination of two or more species. A particularly preferred combination is a (meth)acrylate having a C≧6 alicyclic hydrocarbon group and a compound having two or more (meth)acryl groups, from the viewpoint of enhancement in heat resistance and mechanical strength.

Examples of the a compound having two or more (meth)acryl groups include 1,4-butanediol dimethacrylate, 1,4-butanediol diacrylate, dipropylene glycol dimethacrylate, diethylene glycol dimethacrylate, diethylene glycol diacrylate, alkoxylated hexanediol diacrylate, 1,6-hexanediol dimethacrylate, 1,6-hexanediol diacrylate, neopentyl glycol dimethacrylate, polyethylene glycol (600) dimethacrylate, polyethylene glycol (600) diacrylate, polyethylene glycol (400) dimethacrylate, polyethylene glycol (400) diacrylate, polyethylene glycol (200) diacrylate, polypropylene glycol (400) dimethacrylate, ethoxylated (4) bisphenol A diacrylate, 1,3-dibutylenediol dimethacrylate, 1,3-dibutylenediol diacrylate, ethoxylated (10) bisphenol A diacrylate, ethoxylated (2) bisphenol A diacrylate, ethoxylated (4) bisphenol A dimethacrylate, ethoxylated (4) bisphenol A diacrylate, ethoxylated (30) bisphenol A dimethacrylate, tricyclodecanemethanol diacrylate, ethoxylated bisphenol A dimethacrylate, propoxylated (2) neopentyl glycol diacrylate, alkoxylated fatty acid diacrylate, triethylene glycol dimethacrylate, triethylene glycol diacrylate, pentaerythritol triacrylate, pentaerythritol tetraacrylate, pentaerythritol pentaacrylate, ethoxylated (3) trimethyolpropane triacrylate, ethoxylated (6) trimethylolpropane triacrylate, ethoxylated (9) trimethylolpropane triacrylate, propoxylated (6) trimethylolpropane triacrylate, propoxylated (3) glyceryl triacrylate, high-propoxylated (55) glyceryl triacrylate, ethoxylated (15) trimethylolpropane triacrylate, trimethylolpropane trimethacrylate, tetraethylene glycol diacrylate, dimethylolpropane tetraacrylate, tripropylene glycol diacrylate, pentaacrylate ester, 1,3-adamantanediol dimethacrylate, 1,3-adamantanediol diacrylate, 1,3-adamantanedimethanol dimethacrylate, and 1,3-adamantanedimethanol diacrylate.

The compound having two or more (meth)acryl groups is preferably incorporated in an amount of 1 to 60 mass % into the (meth)acrylate resin composition, particularly preferably in an amount of 5 to 40 mass %. When the amount is 1% or more, the cured product has an enhanced heat resistance, whereas when the amount is 60% or less, resistance to heat-induced yellowing is enhanced.

In the (meth)acrylate resin composition of the present invention, the amount of the aforementioned (meth)acrylate copolymer for syrup is 1 to 60 mass %, preferably 5 to 40 mass %. When the amount of (meth)acrylate copolymer for syrup is 1 mass % or more, a viscosity suitable for handling during curing can be obtained, and shrinkage during curing can be reduced, whereas when the amount is 60 mass % or less, excellent heat resistance and weather resistance can be attained.

The viscosity of the (meth)acrylate resin composition of the present invention, as measured by means of a rheometer at 25° C., is preferably 100 mPa·s to 100 Pa·s, more preferably 200 mPa·s to 10 Pa·s. When the viscosity is 100 mPa·s or higher, leakage of the composition through a mold during curing, generation of fins of cured products, and hanging of applied composition can be prevented, leading to good handling performance and moldability. When the viscosity is 100 Pa·s or less, casting to a mold and application of the composition are facilitated.

The (meth)acrylate resin composition of the present invention can be cured through heating generally at 0 to 250° C., preferably 20 to 200° C., for about 1 minute to about 24 hours. Upon curing, the aforementioned radical polymerization initiator may also be employed. Alternatively, photo-curing (e.g., UV-curing) may be employed.

The (meth)acrylate resin composition of the present invention may also be cured through two or more steps performing at different temperatures. In one preferred mode, a first step is performed at 0 to 160° C., and a second step is performed at a temperature higher by about 5 to about 150° C. than the temperature of the first step. In another mode, a first step is performed through photo-curing, and a second step is performed thermal curing. Through performing 2-step curing, unreacted monomer remaining in a molded product and warpage of the product can be decreased.

The thus-produced (meth)acrylate resin cured product of the present invention, in particular a cured product of a (meth)acrylate compound having an alicyclic ester substituent, has high transparency and high resistance to UV rays and heat. Thus, the cured product can be suitably used as a material for lenses, illumination devices, automobiles, displays, optical-semiconductors, etc.

EXAMPLES

The present invention will next be described in more detail by way of examples, which should not be construed as limiting the invention thereto.

Physical properties of the cured products obtained in the Examples and Comparative Examples were evaluated through the following methods.

(1) Total Light Transmittance

The total light transmittance (%) of a sample (thickness: 3 mm) was measured in accordance with JIS K7105 by means of a test machine HGM-2DP (product of Suga Test Instruments). The sample was placed in a thermostat bath at 140° C. for 100 hours, and then the total light transmittance was measured again. The difference in total light transmittance (%) between the initial value and the second value was employed as Δ (total light transmittance).

(2) Determination of Yellowing Index (YI)

The yellowing index (YI) of a sample (thickness: 3 mm) was measured in accordance with JIS K7105 by means of an SZ-optical SENSOR (product of Nippon Denshoku Industries Co., Ltd.). The following weathering test was performed.

$\Delta YI^1$: A sample was irradiated with UV light at an output of 500 W/m² for 100 hours by means of a weathering-test meter (Solarbox 1500e, JASCO International). YI of the sample was measured before and after irradiation, and the difference between two values was employed as $\Delta YI^1$.

$\Delta YI^2$: A sample was placed in a thermostat bath at 140° C. for 100 hours. The YI of the sample was measured before and after heating, and the difference between two YI values was employed as $\Delta YI^2$.

Example 1

Toluene (150 mL), 1-adamantyl methacrylate (32 g) (product of Osaka Organic Chemical Industry Ltd.), methoxypolyethylene glycol #400 methacrylate (18 g) (M-90G, product of Shin-Nakamura Chemical Co., Ltd.), and 2,2'-azobis(2-methylbutyronitrile) (0.027 g) (product of Wako Pure Chemical Industries, Ltd.) were placed in a glass vessel, and the mixture was allowed to react at 80° C. for 2 hours in a nitrogen atmosphere. To the resultant solution, an excessive amount of methanol was added, to thereby precipitate a copolymer. The copolymer was dried in vacuum at 80° C. for 4 hours. The yield of the copolymer was 26 g.

A $^1$H-NMR analysis revealed that the monomer units derived from 1-adamantyl methacrylate account for 72 mass %, and those derived from methoxypolyethylene glycol #400 methacrylate account for 28 mass %. The copolymer was found to have a molecular weight (Mw), as measured through GPC, of 250,000 as reduced to polystyrene.

To the thus-obtained copolymer (2 g), 1-adamantyl methacrylate (5.6 g) (product of Osaka Organic Chemical Industry Ltd.) and polyethylene glycol #400 dimethacrylate (2.4 g) (9G, product of Shin-Nakamura Chemical Co., Ltd.) were added, and the mixture was heated to 90° C., to thereby dissolve the copolymer. The solution was cooled to room temperature, and 1,1-bis(t-hexylperoxy)cyclohexane (0.04 g) (Perhexa HC, product of Nippon Oil & Fats Co., Ltd.) and bis(4-t-butylcyclohexyl) peroxydicarbonate (0.04 g) (Peroyl TCP, product of Nippon Oil & Fats Co., Ltd.) were added to the solution, followed by mixing, to thereby yield a curable composition.

The viscosity of the curable composition, as determined by means of a rheometer (RMS-800, product of Reometrics) at 25° C., was 5,000 mPa·s. The composition was poured into a cell formed of two glass plates and a spacer (thickness: 3 mm, made of Teflon (registered trademark)) disposed therebetween. The cell holding the composition was heated in an oven at 70° C. for 3 hours, then at 160° C. for 1 hour, and cooled to room temperature, to thereby yield a transparent and colorless cured material in a plate form. The properties of the obtained cured material were evaluated. The results are shown in Table 1.

Example 2

To toluene (150 mL), 1-adamantyl methacrylate (25 g) (product of Osaka Organic Chemical Industry Ltd.), stearyl methacrylate (25 g) (Acrylester S, product of Mitsubishi Rayon Co., Ltd.), and 2,2'-azobis(2-methylbutyronitrile) (0.027 g) (product of Wako Pure Chemical Industries, Ltd.) were added, and the mixture was allowed to react at 80° C. for 2 hours in a nitrogen atmosphere.

To the resultant solution, an excessive amount of methanol was added, to thereby precipitate a copolymer. The copolymer was dried in vacuum at 80° C. for 4 hours. The yield of the copolymer was 30 g. A $^1$H-NMR analysis revealed that the monomer units contained derived from 1-adamantyl methacrylate account for 59 mass %, and those derived from stearyl methacrylate account for 41 mass % The copolymer was found to have a molecular weight (Mw), as measured through GPC, of 277,000 as reduced to polystyrene.

To the copolymer (22 g), 1-adamantyl methacrylate (38.5 g) (product of Osaka Organic Chemical Industry Ltd.), stearyl methacrylate (38.5 g) (Acrylester S, product of Mitsubishi Rayon Co., Ltd.), and polyethylene glycol #400 dimethacrylate (11 g) (9G, product of Shin-Nakamura Chemical Co., Ltd.) were added, and the mixture was heated to 90° C., to thereby dissolve the copolymer.

The thus-obtained solution was cooled to room temperature, and 1,1-bis(t-hexylperoxy)cyclohexane (0.47 g) (Perhexa HC, product of Nippon Oil & Fats Co., Ltd.) and bis(4-t-butylcyclohexyl) peroxydicarbonate (0.47 g) (Peroyl TCP, product of Nippon Oil & Fats Co., Ltd.) were added to the solution, followed by mixing, to thereby yield a curable resin composition. The viscosity of the resin composition (at 25° C.) was 1,000 mPa·s.

The composition was poured into a cell formed of two glass plates and a spacer (thickness: 3 mm, made of Teflon) disposed therebetween. The cell holding the composition was heated in an oven at 70° C. for 3 hours, then at 160° C. for 1 hour, and cooled to room temperature, to thereby yield a transparent and colorless cured material in a plate form. The properties of the obtained cured material were evaluated. The results are shown in Table 1.

Example 3

To the copolymer (0.7 g) obtained in Example 1 1,1-adamantyl methacrylate (6.5 g) (product of Osaka Organic Chemical Industry Ltd.) and polybutylene glycol dimethacrylate (2.8 g) (Acrylester PBOM, product of Mitsubishi Rayon Co., Ltd.) were added, and the mixture was heated to 90° C., to thereby dissolve the copolymer. The solution was cooled to room temperature, and 1,1-bis(t-hexylperoxy)cyclohexane (0.04 g) (Perhexa HC, product of Nippon Oil & Fats Co., Ltd.) and bis(4-t-butylcyclohexyl)peroxydicarbonate (0.04 g) (Peroyl TCP, product of Nippon Oil & Fats Co., Ltd.) were added to the solution, followed by mixing, to thereby yield a curable composition.

The viscosity of the curable composition (at 25° C.) was 250 mPa·s. The composition was poured into a cell formed of two glass plates and a spacer (thickness: 3 mm, made of Teflon) disposed therebetween. The cell holding the composition was heated in an oven at 70° C. for 3 hours, then at 160° C. for 1 hour, and cooled to room temperature, to thereby yield a transparent and colorless cured material in a plate form. The properties of the obtained cured material were evaluated. The results are shown in Table 1.

Example 4

Toluene (45 mL), 1-adamantyl methacrylate (10 g) (product of Osaka Organic Chemical Industry Ltd.), methyl methacrylate (5 g) (product of Merck Ltd.), and 2,2'-azobis(2-methylbutyronitrile) (0.02 g) (product of Wako Pure Chemical Industries, Ltd.) were placed in a glass vessel, and the mixture was allowed to react at 65° C. for 3 hours in a nitrogen atmosphere. To the resultant solution, an excessive amount of methanol was added, to thereby precipitate a copolymer. The copolymer was dried in vacuum at 80° C. for 4 hours. The yield of the copolymer was 4.0 g.

A $^1$H-NMR analysis revealed that the monomer units derived from 1-adamantyl methacrylate account for 75 mass %, and those derived from methyl methacrylate account for 25 mass %. The molecular weight (Mw), as measured through GPC, was 164,000 as reduced to polystyrene.

To the thus-obtained copolymer (3.0 g), 1-adamantyl methacrylate (15.3 g) (product of Osaka Organic Chemical Industry Ltd.) and polybutylene glycol dimethacrylate (7.8 g) (Acrylester PBOM, product of Mitsubishi Rayon Co., Ltd.) were added, and the mixture was heated to 120° C., to thereby dissolve the copolymer. The solution was cooled to room temperature, and 1,1-bis(t-hexylperoxy)cyclohexane (0.1 g) (Perhexa HC, product of Nippon Oil & Fats Co., Ltd.) and bis(4-t-butylcyclohexyl)peroxydicarbonate (0.1 g) (Peroyl TCP, product of Nippon Oil & Fats Co., Ltd.) were added to the solution, followed by mixing, to thereby yield a curable composition.

The viscosity of the curable composition (at 25° C.) was found to be 1,100 mPa·s. The composition was poured into a cell formed of two glass plates and a spacer (thickness: 3 mm, made of Teflon (registered trademark)) disposed therebetween. The cell holding the composition was heated in an oven at 70° C. for 3 hours, then at 160° C. for 1 hour, and cooled to room temperature, to thereby yield a transparent and colorless cured material in a plate form. The properties of the obtained cured material were evaluated. The results are shown in Table 1.

Comparative Example 1

2,2'-Azobis(2-methylbutyronitrile) (0.02 g) (product of Wako Pure Chemical Industries, Ltd.) was added to toluene (45 mL) and 1-adamantyl methacrylate (16 g) (product of Osaka Organic Chemical Industry Ltd.), and the mixture was allowed to react at 80° C. for 3 hours in a nitrogen atmosphere. To the resultant solution, an excessive amount of methanol was added, to thereby precipitate a polymer. The polymer was dried in vacuum at 80° C. for 4 hours. The yield of the polymer was found to be 13.8 g. The molecular weight (Mw) of the polymer, as measured through GPC, was 110,000 as reduced to polystyrene.

To the polymer (2.0 g), 1-adamantyl methacrylate (5.4 g) (product of Osaka Organic Chemical Industry Ltd.) and polyethylene glycol #400 dimethacrylate (2.4 g) (9G, product of Shin-Nakamura Chemical Co., Ltd.) were added, and the mixture was heated to 120° C. However, the polymer was not dissolved in the monomers.

Comparative Example 2

1-Adamantyl methacrylate (5.6 g) (product of Osaka Organic Chemical Industry Ltd.) and polyethylene glycol #400 dimethacrylate (2.4 g) (9G, product of Shin-Nakamura Chemical Co., Ltd.) were added to poly(methyl methacrylate) (2.0 g) (Mw: 120,000, product of Aldrich), and the mixture was heated to 120° C. However, the polymer was not dissolved in the monomers.

TABLE 1

|  | Ex. 1 | Ex. 2 | Ex. 3 | Ex. 4 | C. Ex. 1 | C. Ex. 2 |
|---|---|---|---|---|---|---|
| Copolymer for syrup (g, mass %) | | | | | | |
| Component (A) | | | | | | |
| Methoxypolyethylene glycol #400 methacrylate | 18 (28) | | 18 (28) | | | |
| Stearyl methacrylate | | 25 (41) | | | | |
| Methyl methacrylate | | | | 5 (25) | | |
| Component (B) | | | | | | |
| 1-Adamantyl methacrylate | 32 (72) | 25 (59) | 32 (72) | 10 (75) | 16 (100) | |
| Radical polymerization initiator | | | | | | |
| 2,2'-Azobis(2-methoxybutyronitrile) | 0.027 | 0.027 | 0.027 | 0.02 | 0.02 | |
| Molecular weight (Mw) of copolymer for syrup | 250,000 | 277,000 | 250,000 | 164,000 | 110,000 | |
| (Meth)acrylate resin composition | | | | | | |
| Copolymer for syrup | 2.0 (20) | 22.0 (20) | 0.7 (7) | 3.0 (11) | 2.0 (20.4) | |
| Poly(methyl methacrylate) | | | | | | 2.0 (20) |
| Component (C) | | | | | | |
| 1-Adamantyl methacrylate | 5.6 (56) | 38.5 (35) | 6.5 (65) | 15.3 (59) | 5.4 (55.1) | 5.6 (56) |
| Polyethylene glycol #400 dimethacrylate | 2.4 (24) | 38.5 (35) | | | 2.4 (24.5) | 2.4 (24) |
| Polybutylene glycol dimethacrylate | | | 2.8 (28) | 7.8 (30) | | |
| Stearyl methacrylate | | 11.0 (10) | | | | |
| Radical polymerization initiator | | | | | | |
| Perhexa HC | 0.04 | 0.47 | 0.04 | 0.03 | | |
| Peroyl TCP | 0.04 | 0.47 | 0.04 | 0.03 | | |
| Solubility of polymer | Soluble | Soluble | Soluble | Soluble | Insoluble | Insoluble |
| Evaluation of properties | | | | | | |
| (1) Total light transmittance (%) | 89 | 87 | 88 | 87 | | |
| ΔTotal light transmittance (%): 140° C. 100 hr | 0.8 | 1.0 | 0.7 | 1.2 | | |
| (2) Degree of yellowing (YI) | 3.2 | 3.5 | 3.1 | 3.7 | | |
| $\Delta YI^1$: Weather resistance (ultraviolet ray) | 0.1 | 0.1 | 0.1 | 0.1 | | |
| $\Delta YI^2$: Heat resistance (140° C. 100 hr) | 2.1 | 1.5 | 1.8 | 1.7 | | |

The data shown in Table 1 suggest the following conclusions:

(1) A (meth)acrylate copolymer for syrup, which was produced according to the present invention and was used in Examples 1 to 4, exhibited excellent solubility in a (meth)acrylate monomer including a (meth)acrylate compound having a C≧6 alicyclic hydrocarbon group (e.g., 1-adamantyl group) bonded thereto via an ester bond, and an acrylic resin having excellent stability to UV rays and heat were produced.

(2) In contrast, in Comparative Example 1, where a copolymer for syrup containing no component (A) was employed, and in Comparative Example 2, where poly(methyl methacrylate) was employed as a syrup, and an acrylic resin having excellent stability to UV rays and heat was not produced.

INDUSTRIAL APPLICABILITY

The (meth)acrylate copolymer for syrup of the present invention has excellent solubility, particularly in a (meth)acrylate compound having an alicyclic ester substituent, and a (meth)acrylate resin composition containing the copolymer provides a stable cured product having high transparency and high resistance to UV rays and heat. Thus, the cured product is suitably used as a material for lenses, illumination devices, automobiles, displays, optical-semiconductors, etc.

The invention claimed is:

1. A (meth)acrylate resin composition, comprising:
   (C) a (meth)acrylate monomer; and
   1 to 60 mass % of a (meth)acrylate copolymer formed from:
   (A) 1 to 60 mass % of at least one (meth)acrylate compound selected from the group consisting of (meth)acrylate-modified silicone oil, an alkyl (meth)acrylate, a monoalkylene glycol (meth)acrylate, and a polyalkylene glycol (meth)acrylate, and (B) 99 to 40 mass % of a (meth)acrylate compound having a six or more carbon atom containing alicyclic hydrocarbon group bonded thereto via an ester bond.

2. A (meth)acrylate resin composition as defined in claim 1, wherein component (B) is a (meth)acrylate compound having at least one alicyclic hydrocarbon group selected from the group consisting of an adamantyl group, a norbornyl group, an isobornyl group, and a dicyclopentanyl group and bonded thereto via an ester bond.

3. A (meth)acrylate resin composition as defined in claim 2, wherein component (B) is a (meth)acrylate compound having an adamantyl group bonded thereto via an ester bond.

4. A (meth)acrylate resin composition as defined in claim 1, wherein (C) the (meth)acrylate monomer is a (meth)acrylate compound having a six or more carbon atom containing alicyclic hydrocarbon group bonded thereto via an ester bond.

5. A (meth)acrylate resin composition as defined in claim 4, wherein (C) the (meth)acrylate monomer is a (meth)acrylate compound having an adamantyl group bonded thereto via an ester bond.

6. A (meth)acrylate resin cured product obtained by a process comprising curing a (meth)acrylate resin composition as recited in claim 1.

7. A (meth)acrylate resin composition as defined in claim 1, wherein the (meth)acrylate copolymer is formed from at least one polyalkylene glycol (meth)acrylate having a (meth)acrylate moiety at one end.

8. A (meth)acrylate resin composition as defined in claim 7, wherein the at least one polyalkylene glycol (meth)acrylate having a (meth)acrylate moiety at one end is selected from the group consisting of polyethylene glycol (meth)acrylate, polypropylene glycol (meth)acrylate, polybutylene glycol (meth)acrylate and mixtures thereof.

9. A (meth)acrylate resin composition as defined in claim 1, comprising as (meth)acrylate monomer (C) a (meth)acrylate having a six or more carbon atom containing alicyclic hydrocarbon group and a compound having two or more (meth)acryl groups.

10. A (meth)acrylate resin composition as defined in claim 5, wherein component (B) is a (meth)acrylate compound having an adamantyl group bonded thereto via an ester bond.

* * * * *